United States Patent [19]

Chamberlin et al.

[11] Patent Number: 4,703,325

[45] Date of Patent: Oct. 27, 1987

[54] REMOTE SUBSYSTEM

[75] Inventors: Frederick C. Chamberlin, Syracuse, N.Y.; Charles Whynacht, Glastonbury, Conn.; Peter D. Carter, Tolland, Conn.; Charles S. Wilson, Newington, Conn.

[73] Assignee: Carrier Corp., Syracuse, N.Y.

[21] Appl. No.: 663,622

[22] Filed: Oct. 22, 1984

[51] Int. Cl.[4] ........................ G08B 23/00; G05B 23/02

[52] U.S. Cl. .......................... 340/825.17; 340/825.16; 340/825.15; 340/517; 340/520; 364/551

[58] Field of Search ...................... 340/825.17, 825.16, 340/825.15, 21, 520, 517, 548, 500, 506, 825.06, 505; 364/550, 551

[56] References Cited

U.S. PATENT DOCUMENTS

Re. 24,031 6/1955 Marmorstone .
2,492,730 12/1949 Bischoff .
2,775,752 12/1956 Hoberman .
3,214,734 10/1965 Whitehead ..................... 340/825.16
3,293,605 12/1966 Moore .
3,474,443 10/1969 Lightner et al. .
3,480,938 11/1969 Martin .
3,550,122 12/1970 Siddiqi .
3,729,734 4/1973 Kipling .
3,744,043 7/1973 Walden et al. .
3,872,473 3/1975 Melgaard et al. .
3,925,763 12/1975 Wadhwani et al. .
3,942,166 3/1976 Peral et al. .
3,960,011 6/1976 Renz et al. .
3,965,469 6/1976 Ryan .
3,967,281 6/1976 Dageford .
4,246,493 1/1981 Beeghly .
4,295,129 10/1981 Cade .
4,395,705 7/1983 Tsutsumi et al. .
4,551,718 11/1985 Cookson et al. ................ 340/506 X
4,568,909 2/1986 Whynacht ............................ 340/21
4,644,478 2/1987 Stephens et al. ............... 340/506 X

*Primary Examiner*—Ulysses Weldon
*Assistant Examiner*—Ralph E. Smith
*Attorney, Agent, or Firm*—Francis J. Maguire, Jr.

[57] ABSTRACT

A Remote Subsystem for monitoring a large number of parameters relating to operating equipment at a remote site is disclosed. A monitoring system having a plurality of local service offices each reporting to a central office and each having a plurality of remote subsystems at remote sites reporting to it is also disclosed. Each remote subsystem reports only a first alarm condition detected for a particular unit of equipment to its local office and reports the unit back in a normal operating condition only after all detected alarm conditions have returned to a non alarm status. In this way, the local and central offices are not inundated with information of little value. Each remote subsystem also monitors conditions that are indicative of impending alarm conditions in order to alert local and central service offices of developing problems in the field. Similarly, each remote system monitors and accumulates miscellaneous data useful for a variety of monitoring purposes. Periodic reports are generated from each remote subsystem to the local ofices and on to the central office.

22 Claims, 20 Drawing Figures

FIG. 16
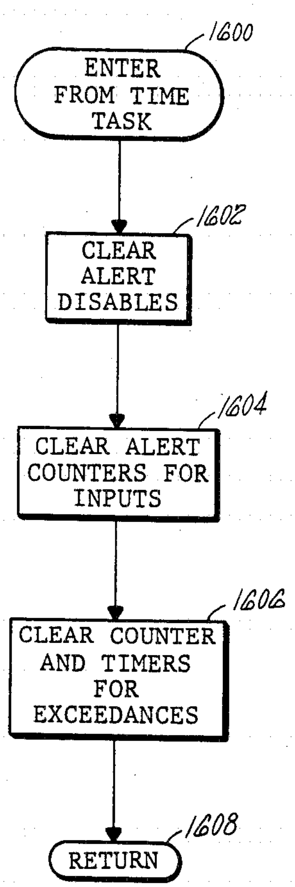
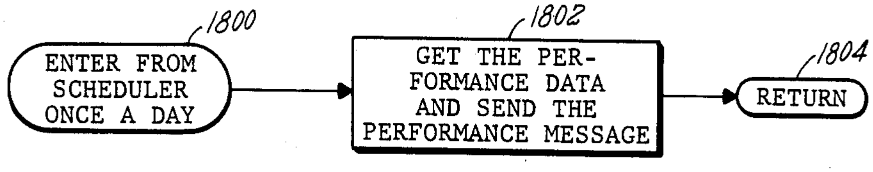
FIG. 18

REMOTE SUBSYSTEM

DESCRIPTION

1. Technical Field

This invention relates to monitoring selected parameters of a plurality of operating devices at a plurality of remote sites, for alerting responsible personnel of significant conditions.

2. Background Art

Any number of devices operating at a plurality of remote sites may be monitored using intelligence gathered at the remote sites and transmitting information on the present status of the sensed parameters during the device's operation at the sites. The parameters selected for monitoring are chosen according to their importance in evaluating the operational condition of a device. In the case of an HVAC system, for example, typical sensors in a chiller, would include evaporator pressure, compressor discharge temperature, chill water flow, condensor water flow, and oil temperatures. These sensors produce signals which may be multiplexed into a transmitter for transmittal to a local office which monitors the status of the plurality of systems. Upon receiving a signal indicating an abnormal condition, the local office personnel may logically infer the operational condition of the system by noting the presence or absence of other abnormal condition signals or other associated sensor parameters.

Generally, the more information received, the more accurate the conclusions that may be drawn concerning the nature of conditions. Once a conclusion is drawn, a service man is then dispatched to the remote location having at least some foreknowledge of the nature of the inoperative condition which permits him to make adequate preparations for quickly correcting the condition.

As the number of monitored parameters increases, the task of evaluating whether and what kind of an alarm condition exists, if any, becomes more difficult. If a local office is monitoring a large number of systems, the amount of performance information received can be very high making the interpretative task even more difficult.

An additional difficulty in using large numbers of monitored parameters is that the interpretative task can become extremely complex, making it likely that the interpretative errors or oversights may occur. If such an error or oversight occurs, the owner of the building in which the inoperative HVAC device is located will eventually telephone requesting a serviceman and providing whatever knowledge he may have concerning the nature of the inoperative condition. However, this is a highly undesirable form of receiving the information needed to efficiently deploy a service organization. This is especially true when a monitoring system has been installed in a building for the purpose of immediately detecting such inoperative conditions at a local service office.

Inventor Charles Whynacht invented a REMOTE ELEVATOR MONITORING SYSTEM, U.S. Pat. No. 562,624, assigned to a co-owned company, which monitors a large number of remote sites at locals and a central and which solves, for some types of systems including elevators, the above described problem. The object of the Whynacht invention was to provide an operating system monitor capable of monitoring parameters and evaluating their states in order to form conclusions concerning the system's performance and to determine whether any predefined alarm conditions were present. According to the Whynacht invention the sensed parameters were stored by a signal processor and compared to previously received values in order to determine if any parameters had changed state. If so, the present value of the changed parameter(s) was (were) plugged into a Boolean expression defining an alarm condition in order to determine if the Boolean expression was satisfied and hence the alarm condition was present. If so, an alarm condition signal was transmitted and displayed as an alarm message.

In addition, the Whynacht invention embraced a group of monitored systems in, for example, a particular geographical area and monitored the various individual systems at a central location in the local geographical area so that appropriate area service actions could be effectively managed. In addition, the Whynacht invention disclosed that many local offices may be grouped together into an overall group which all transmit their data to a headquarters office which monitors many local offices in different geographical areas.

Unfortunately, the Whynacht invention does not reduce the number of alarms received for certain types of systems, e.g., HVAC, in which the Boolean expressions for alarms using combinational logic may not be particularly complex and in which in fact many of the alarms may be unconditional or conditioned merely on the existence of a run state. Another means of reducing the number of alarms without sacrificing accurate detection of alarm conditions is needed for such systems.

DISCLOSURE OF INVENTION

The object of the present invention is to provide improved apparatus for monitoring the status and performance of mechanical and electrical equipment by monitoring selected parameters indicative of the present operating condition of the device and evaluating the parameter states in order to form accurate conclusions concerning the device's current and future performance to a high degree of certainty and to form equally accurate conclusions concerning whether any predefined alarm or alert conditions are present.

According to the present invention the values of particular sensed parameter signals to be evaluated in an alarm group are periodically sampled and stored by a signal processor which compares the present sampled values with values sampled and stored at an earlier time to determine if any parameter signal in the group has changed state, and if so, providing an alarm signal only for the first detected signal in the group that changed state. The alarm signal is transmitted, typically by a modem, to a related office, typically a local office. The alarm signal may also be transmited to a central office.

In further accord with the present invention, the alarm signal may be used by a display to provide an alarm message. When all of the sensed parameter signals change back to a normal operating state, a return to normal signal is provided to the display which then provides a return to normal message.

In still further accord with the present invention, the signal processor may be programmed to provide an alarm signal only if a selected monitored device is detected in a run mode.

In still further accord with the present invention, the signal processor may be programmed to provide the alarm signal only if a selected monitored device has been detected in a run mode for a selected period.

In still further accord with the present invention, the signal processor may be programmed to provide the alarm signal only if the first discrete signal which has been detected in a changed state, remains in that changed state for a selected period.

In still further accord with the present invention, the signal processor may be programmed to provide additional alarm signals for the first signal to change state only after all of the discrete signals in the alarm group have returned to normal and a return to normal signal has been provided to the modem. The signal processor may also inhibit additional alarm and return to normal signals for a particular piece of equipment for a chosen interval after providing an alarm signal for that particular piece of equipment. Of course, a return to normal signal associated with the initiating alarm signal for the particular piece of equipment is not inhibited.

In still further accord with the present invention, the signal processor may be programmed to record over a period, for example, one day, the total amount of time that the alarming unit remains in an alarm condition and periodically provides a signal indicitive of the total time to the modem for transmission. The number of occurances of alarm conditions for each unit over the same period or any other period may also be periodically provided to the modem for transmission.

In still further accord with the present invention, the remote subsystem may also include memory for storing identification information relating to a particular subsystem and for storing historical information relating to the past states of each of the parameter signals monitored within the particular subsystem. The remote system may also include a timer for monitoring the time of day and storing the time and duration of alarm conditions. The alarm status signal may include such information so that the identity of the subsystem, the particular unit of equipment in an alarm state, the nature of the alarm condition, the date and time of the change of state of the first signal to change, and the date of time of transmission may be provided via the modem. Of course the return to normal signal can also be configured to provide similar identification and timing information.

In still further accord with the present invention, the performance of a unit or device is monitored by counting the number of state changes in a particular parameter signal and providing a performance alert signal only after the detection of a selected number of such state changes.

In still further accord with the present invention, the signal processor provides a performance alert signal only if a selected number of state changes are counted within a selected elapsed time interval.

In still further accord with the present invention data points are monitored to serve as the basis for run mode dependancy relationships with other points on the same equipment. The total number of occurrances and totalized time of occurance per day for each data point is accumulated and buffered for batch transfer with similar alert data. Data points also serve as monitored points for exceedance alerts.

In still further accord with the present invention, all daily counts and totalized time for each discrete alarm, alert and data point will be accumulated and retained temporarily by the remote subsystem as "Daily Summary Data". It will be transmitted either automatically each day at a selected time (phased with other remote subsystems within a local office's jurisdiction), or automatically once a week at a selected day and time with accumulated daily segments, or only by command from the appropriate office, if and when it is wanted.

The remote system monitor of the present invention provides an intelligent means of automatically evaluating the operational status of an operating system. It also may be used for automatically evaluating the status of a plurality of systems organized in local geographical areas each reporting to an associated local office. The demanding task of evaluating many hundreds, thousands, or hundreds of thousands of performance data is greatly reduced by providing only the first alarm to be sensed and only significant alert conditions in a message to be displayed. This automatically reduces the quantity of received messages and data while at the same time providing valuable information as to the probable source of the problem. Knowledge of the first alarm condition to actuate is necessary in inferring the probable source of trouble. The automatic provision of alarm messages to the local office insures that proper evaluation of the messages leads to efficient deployment of the local office service force. In this way, the quality of services performed for the equipment customer is greatly improved. In many cases, a deteriorating or deleterious condition may be detected by means of alerts before it causes an equipment disablement. In cases where a disablement has occurred, the nature of the problem can often be identified by means of alarms before dispatching the serviceman so that the nature of the corrective action required may be determined in advance. Local and central office personnel may also be kept informed as to performance by means of data, operating problems, and disablements in all field equipment. This provides an extremely valuable management tool for the headquarters operation. Personnel at the central monitoring center are able to closely monitor the performance of essentially all of the equipment in the field. A continuation of field service response may then be assured, even when the field offices are not occupied, which may be a considerable amount of a normal work week.

Performance trends may be detected and accurate forecasts devised for use in business planning. The instantanous nature of the knowledge provided as to the effectiveness of the service force in remedying field problems is also an invaluable aid to management in identifying and correcting local service offices having unsatsfactory service records. When retransmitted to a central office, essential information necesary for long term performance projections and for the evaluation of the effectiveness of local service offices is provided for use by central office personnel.

BRIEF DESCRIPTION OF DRAWINGS

FIG. 16 is a flowchart illustration of a clear subroutine;

FIG. 18 is a flowchart illustration of an autotask routine;

BEST MODE FOR CARRYING OUT THE INVENTION

Figure 1:
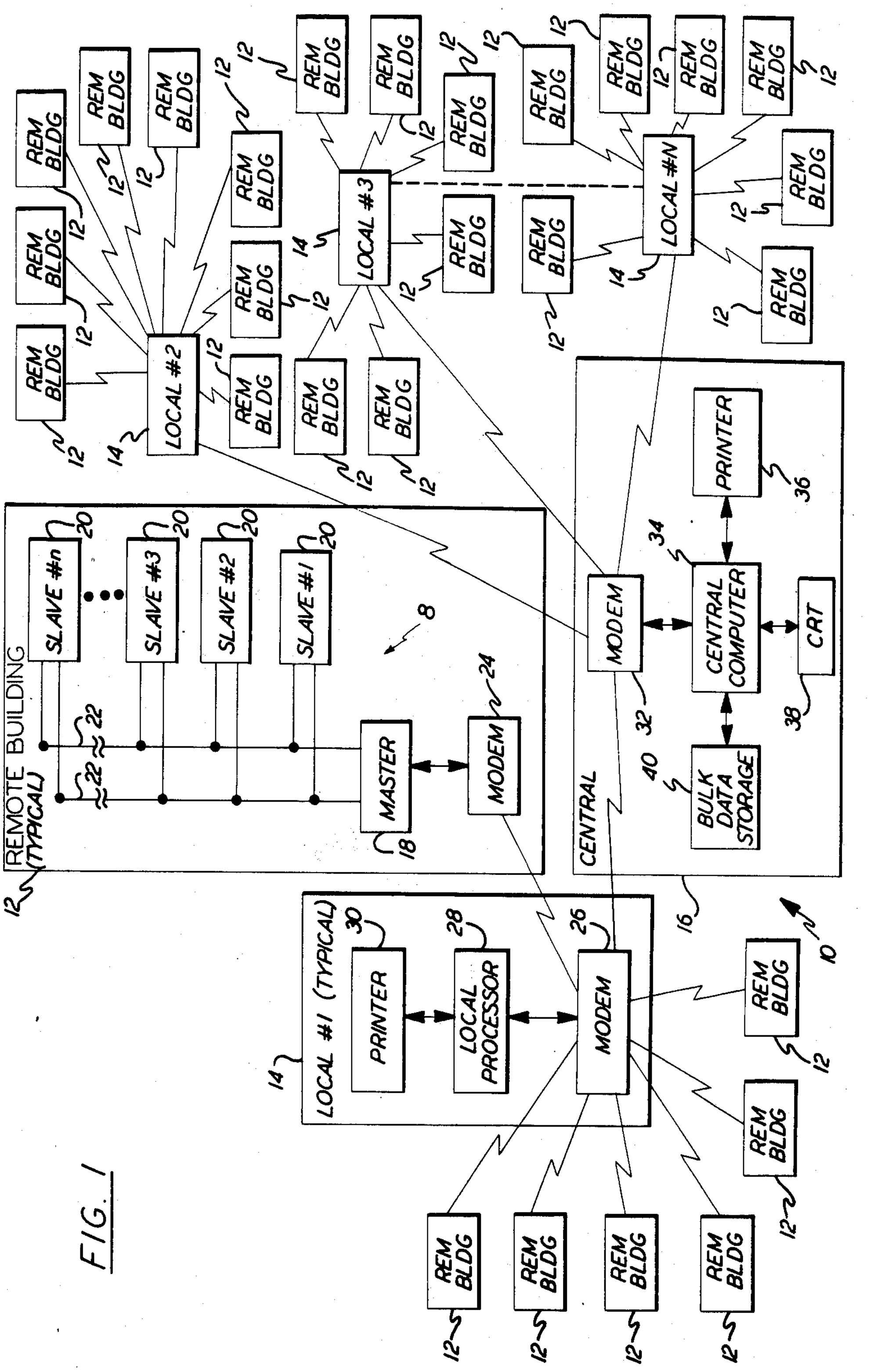
FIG. 1 is a system block diagram of a remote subsystem monitoring system according to the present invention.
Figure 2:
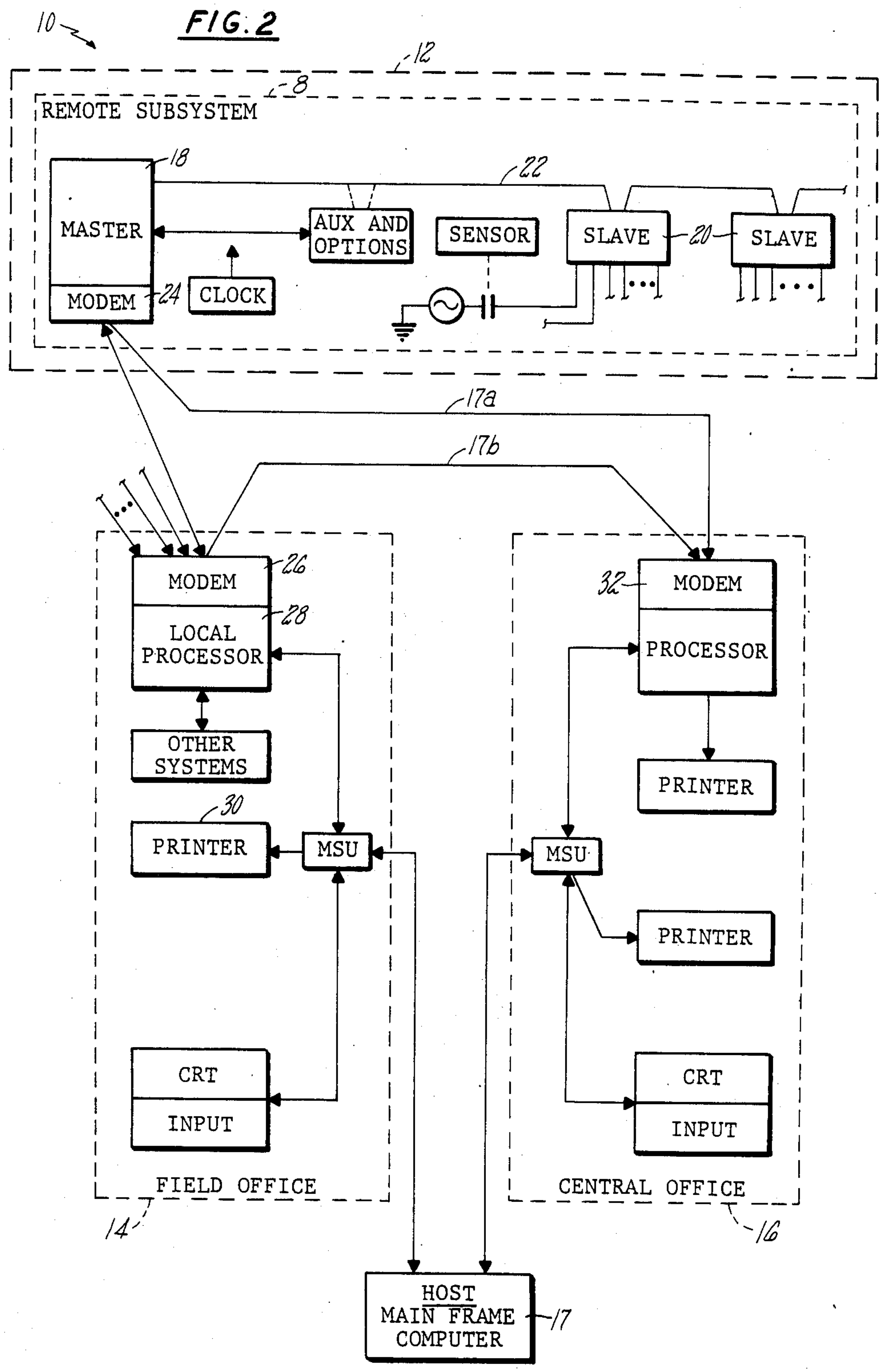
FIG. 2 is a second, alternative, system block diagram of a remote subsystem monitoring system (showing only one subsystem) according to the present invention.

FIGS. 1 & 2 both illustrate a remote subsystem 8 monitoring system 10, according to the present invention, for monitoring equipment, individual operating units, or devices in remotely located buildings 12, and for transmitting alarm, alert and performance information to associated local monitoring units 14. In both FIGS. 1 & 2 the transmitted information is ultimately provided to a central monitoring center 16. However, the flow of information in FIG. 1 is from the remote subsystem 8 to the local office 14 and on to the central office 16. In FIG. 2, the flow of information is from the remote subsystem 8 to the local office 14, to a host main frame computer 17 for processing and then back to both the field office 14 and on to the central office 16. FIG. 2 additionally shows backup phone connections on lines 17*a*, 17*b* from the remote subsystem 8 and the field office 14, respectively, to the central office 16.

The method of communication between the remote buildings 12, the various local offices 14, and the centralized office 16 may be any viable communication system whereby inoperative equipment, operating units, or devices are identified and individual device performance information is transferred to both local and/or central offices. Such a system may include local telephone lines, microwave transmission methods, dedicated phone lines, or any similar systems or combinations thereof. Each remote subsystem 8 may include a master 18 and one or more slaves 20. The individual slaves are attached to sensors associated with a particular equipment, unit, or device. The slaves transmit signals indicative of the status of selected parameters via a communications line 22 which may consist of an unshielded pair of wires. The use of a two wire communications line between the master 18 and its associated slaves 20 provides an inexpensive means of data transmission.

Each master includes a microprocessor which evaluates the performance data and determines whether any significant conditions exist according to a state machine model which is coded within the software of the microprocessor. Each master communicates with a modem 24 which transmits alarm, alert and performance data to a modem 26 in the associated local monitoring unit 14. Although the architecture of the remote subsystem has been described as having a master communicating with one or more slaves using an efficient two wire communications line, it should be understood by those skilled in the art that other means of data collection and transmission including less efficient means may also be used. It should also be understood that because the number of slaves capable of being attached to a given communications line is finite, it may be necessary within a given remote building to utilize more than one master-slave group.

Each of the remote buildings 12 communicates with its associated local monitoring unit 14 to provide alarm, alert and performance data. A local processor 28 of FIG. 1 stores the received data internally and alerts local personnel as to the existence of significant conditions useful for improving service. The local processor 28 alerts local personnel of these conditions via a printer 30. It should be understood that other means of communicating with local personnel, such as a CRT may as easily be used. The local processor 28 of FIG. 2 first provides the received information to the host main frame computer 17 where the information is processed for additional information, descriptive text, etc. Then the information is sent back to the local processor 28 from the main frame computer 17 where it is displayed, for example, on the printer 30. The modem 28 of FIG. 1, or the modem 24 of FIG. 2 causes alarm, alert and performance data from the remotes to be transmitted to a modem 32 within the central monitoring center 16. However, in FIG. 2, the modem 24 only communicates directly with the modem 32 under backup conditions. In FIG. 1, a central computer 34 receives data from the modem 32 and provides alarm and performance data to central personnel via a printer 36 and a CRT 38. The host computer 17 of FIG. 2 performs a similar function except the flow of information is different, as explained above. It should be understood that although both a printer 36 and a CRT 38 are shown for use with the invention at the central office, the use of only one of them would be sufficient to fully communicate with the central personnel. A bulk data storage unit 40 is shown in FIG. 1 and is used to store alarm and performance data for long term evaluation by central personnel. Although bulk data storage is a desirable feature of the present invention, it should be understood that bulk data storage for the purpose of long term performance evaulation is not absolutely essential for the practice of the present invention. The systems described above in connection with the illustrations of FIGS. 1 & 2 is designed to permit a local office to monitor remote equipment located within its geographical area so that upon the detection of an abnormal condition a serviceman may be immediately dispatched for quick resolution of the problem.

Of course, it should be understood that while the illustration of FIGS. 1 & 2 illustrate two embodiments of the invention, the invention is not restricted thereto. The invention may as easily be implemented using other communication system architectures.

The specific teachings of the Whynacht invention referred to above, U.S. Pat. No. 562,624, with respect to a particular hardware implementation of the data gathering function and the communications protocol employed therein is hereby expressly incorporated by reference. Of course, it should be understood that the particular teachings of the incorporated Whynacht disclosure is merely one means of carrying out the data gathering and communications protocol aspect of the invention described herein.

There are three types of conditions monitored by the master: alarm, alerts, and counts. Their definitions are as follows:

Alarm—indicates any condition requiring an immediate response, e.g., a shutdown or machine safety;

Alert—exceedance of switch cycle count limit or activation of an anticipatory limit switch; and Counts—data base parameters gathered for information purposes, consisting of time totalization and cycle counts;

The subsystem indicates when all the alarm conditions have been corrected for each device by a "return to normal" indication.

Each sensed condition or input to the remote subsystem 8 is called a point and will be wired directly to a terminal on a slave unit 20. The slaves will scan the sensing points and will present the resulting status information to the intelligent master 18 for interpretation and processing. The master will receive the organized data stream from its slaves and will sequentially process the data for type, significance, accuracy and response in accordance with a variety of preconfigured algorithms and procedure tables.

Depending on the type of point, significant and verified data will be either immediately transmitted or will be buffered for bulk transfer at a selected time.

The subsystem may also monitor and report a single key switch input at the remote site which indicates the occurrence of an inspection mode. This "mode" is actuated by a service person disarming the monitoring equipment from detecting alarm or alert conditions. At the end of the inspection mode, the system indicates a finish message.

Each remote subsystem accumulates data on the activity of its attached equipment on a daily basis. Each remote site is assigned a particular nightly calling time when phone rates are low, to forward the previous day's performance data to the local 14. The local of FIG. 1 prints this data and also forwards this data to the central 16. The central 16 of FIG. 2 receives that data via the host 17.

Alarm conditions generally apply to any condition requiring an immediate response by an appropriate office. An open saftey in an equipment control circuit, which will normally shut the equipment down, is the type of condition which qualifies as an alarm condition. The monitored points will usually be discrete (on/off) conditions, typically wired directly to the equipment's native control circuitry. The processor has the capibility to identify the first out in a chain of safeties, in order to isolate the first out from subsequent shut down activities of other safeties an isolation circuits, to identify an ignore apparent safety activity resulting from normal control operation, and to verify the accuracy of the signal. The first-out algorithms for the considerable variety of control circuit strategies in use are rather complex.

Three types of messages are related to alarm conditions. An "alarm" type message is transmitted immediately to identify the point and time of occurance when an alarm condition (such as safety shutdown) occurs and is verified. When all alarm conditions for the equipment (all safeties) have been corrected (typically a manual restart), and "alarm condition corrected" or "return to normal" type message, with the total shutdown time, is transmitted immediately. Also, any alarm conditions still in effect at the time of daily or weekly data transmission generates an "alarm continued" type of message for that equipment and the totalized counts and time of occurance per day for each alarm point is included in the accumulated data point information.

The alert signals each indicate that a deleterious but not yet serious condition has occured within an equipment or its system. It will occur when a monitored condition exceeds a preset limit. Only the first occurence per day of each alert condition is reported, according to one embodiment of the invention, at the time of occurence. Alert points may also be treated as information points in that all incidents of alert conditions will be identified, timed and buffered to accumulate the number of occurences and totalized time of occurence per day for each point. This accumulated information is transmitted once a day with the accumulated data point information (see below). Some alert points are directly connected to the equipment native controls, but most are connected to special controls (temperature switches, pressure switches, etc.) which are added specifically for alert monitoring.

Data points serve several purposes. One purpose is to serve as the basis for run mode dependency relationships with other points on the same equipment. In other words, an alarm condition or an alert condition will not be significant and should not be reported if the particular monitored equipment is not in a normal run mode (i.e., it has been intentionally shutdown), as determined by one or more data points.

A second purpose is to accumulate equipment operating information. The total number of occurances and totalized time of occurance per day for each data point is accumulated and buffered for batch transfer with the similar alert data. This provides operational and analysis information about the equipment and components starts or stops, run time, and alarm and alert relationships.

The third purpose is for exceedance alerts. Exceedance limits of times per day or times per hour are added for count type data points. When the incident count for that point exceeds the selected limit (to many starts, to many cycles, etc.) it is then treated as an alert condition and is reported as described above.

The overall software structure of each master 18 (FIGS. 1 & 2) consists of a scheduler which loops through a task list. The scheduler looks for a task which is ready to run. All tasks have a timer (counter) which is decremented for each tick of a real time clock (e.g., every eight milliseconds). Upon detecting a task which is ready to run, the task is made active and is performed according to the flow charts illustrated in the drawings and which are described in more detail below. Upon completion of this activation, the task is then reset at which time the timing counter begins to run all over again. In this manner, all the application tasks are run at a periodic rate and in an efficient manner. Those tasks not associated with periodic operation are handled on an interrupt basis. Modem communications and real time clock ticks are handled this way.

Figure 3:
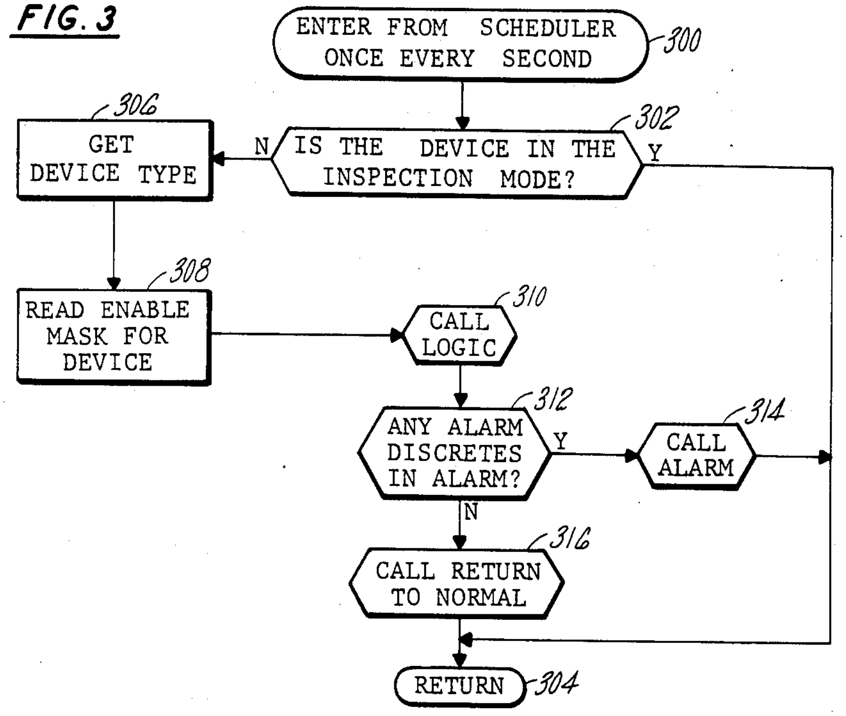
FIG. 3 is a flowchart illustration of an alarm task routine.

Referring now to FIG. 3, an alarm task flow chart is illustrated. The alarm task is scheduled to run once every second as indicated in a step 300. The alarm task in a step 302 first checks to see if the system is in the inspect mode. If this is true, the alarm task routine immediately returns to the scheduler as indicated in a step 304. The purpose of this test is to prevent a false alarm from occuring from a unit when service is being performed by a serviceman on the remote unit. If inspection is not currently active, then the alarm scan task will determine the particular type of device monitored in a step 306 and will then read an enabled mask for the designated alarm points for that particular device and store them in a buffer as shown in a step 308.

Due to the variety of conditions which may enable an input and due to the variety of inputs which may be associated with each type of operating device, a large amount of logic may be required in the software for the particular application to keep track of the device type which the remote subsystem is monitoring and to properly enable and disable those inputs as a function of there condition codes. In order to do this the software maintains what is known as a map or a mask of enabled inputs. As inputs alarm or alert, based upon there particular condition code, they are added or removed from the enabled mask. This enabled mask also allows for the accumulation of time which is associated with certain points. The mask also allows for the accumulation of counts associated with the same points.

A subroutine called "logic" is then called in a step 310 in which the enabled inputs are compared to their previous states and in which the inputs which have changed state are saved and compared to the inputs that changed state the previous time so that the bits that changed state both times can be ignored. If an input has changed state and remained changed for two seconds (i.e., two entrances to the alarm task subroutine of FIG. 3. from the scheduler) it is then added to a map of inputs that changed state and a return is then made from the logic subroutine to the alarm task routine of FIG. 3. The logic subroutine will be described in more detail below.

The alarm task routine of FIG. 3 next executes a step 312 in which a decision is made as to whether any alarm discretes represent a condition of alarm. If an affirmative answer is determind, then the "alarm" subroutine is called in a step 314. If no discretes are in alarm but rather all alarming discretes are in a normal condition then the "return to normal" subroutine is called in a step 316. Each of these subroutines will be described in more detail below. Upon completion of either of these subroutines the alarm scan task is finished and rescheduled.

The purpose of the alarm task routine is to detect an occurrence of an alarming condition or to detect an occurrence of a return to normal condition. In general, once an alarming condition has occured, the initial alarm condition is saved and should that condition remain, or any other alarming condition appear during the next thirty seconds (or other selectable time period) so that at least one alarm condition is present at the expiration of the thirty seconds, an alarm message is sent. It is important to note that only the first alarming condition is saved and therefore, the message received at local will only indicate the first alarming condition and not any of the other subsequent alarms which may occur during the thirty seconds. This is true even if the first alarm to occur goes out of the alarm condition before the expiration of the thirty seconds and another condition, which first appeared after the 30 second timing period commenced but before the first to occur disappeared is present at the expiration of the thirty seconds. Similarly, it is important to note that a return to normal is only possible if all alarming conditions are removed.

Figure 4:
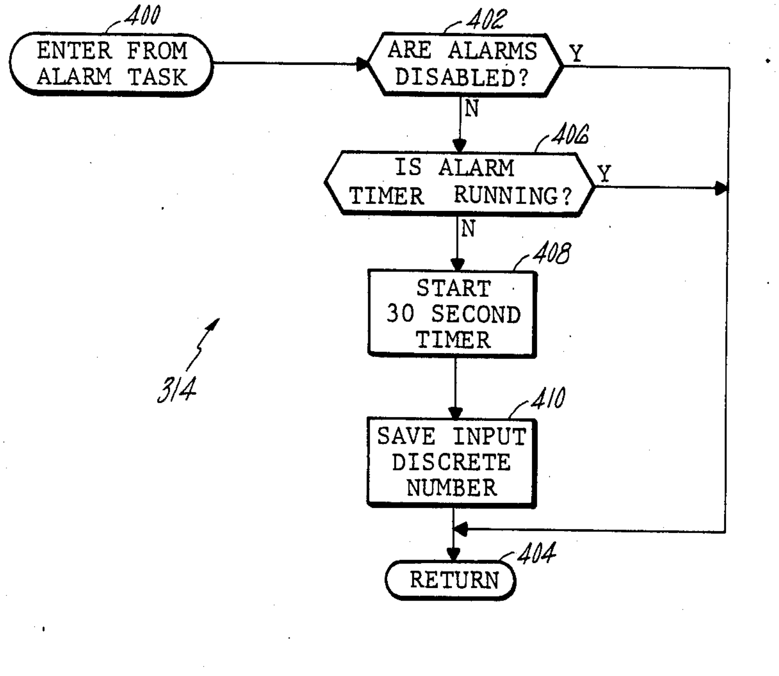
FIG. 4 is a flowchart illustration of an alarm subroutine.

Referring now to FIG. 4, the alarm subroutine referred to in step 314 of FIG. 3 is illustrated. Entrance from the alarm task routine is made in a step 400. The next step 402 involves a decision as to whether any previous alarms have been sent, i.e., whether the alarms are disabled. If a previous alarm has been sent then the entrance to this routine is due to the occurence of a second alarming condition from the device. This second alarming condition is therefore ignored completely and a return is made in a step 404 to the alarm task routine of FIG. 3.

Assuming no previous alarms have been sent, a decision is then made in a step 406 as to whether the thirty second timer has been previously started. If the timer is already running then the alarm subroutine has previously been entered due to an alarming condition, and the present entrance into the routine is due to a redundant alarm from the device within the thirty seconds and a return is immediately made to the alarm task routine. Assuming neither of these is true, the present entrance into the routine is the very first alarming condition to have occurred from the device, and the thirty second timer is started in a step 408. The particular discrete change which occurred for this first alarm is stored in a buffer in a step 410.

Figure 5:
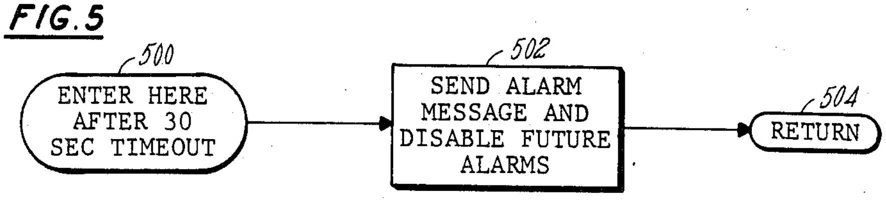
FIG. 5 is a flowchart illustration of an alarm time out subroutine.

Referring now to FIG. 5, an "alarm time-out" subroutine is illustrated. Assuming that no return to normal condition exists for thirty seconds after the timer started in step 408 of FIG. 4, the timer will time out and the program will enter the alarm time out subroutine in a step 500. An interrupt is then generated to the executive which will result in the sending of an alarm message to local as indicated in a step 502. At the same time a disabled alarm flag will be set so that future alarms will not be transmitted to local until a return to normal first occurs. The alarm time out subroutine then returns in a step 504 to the main program.

Figure 6:
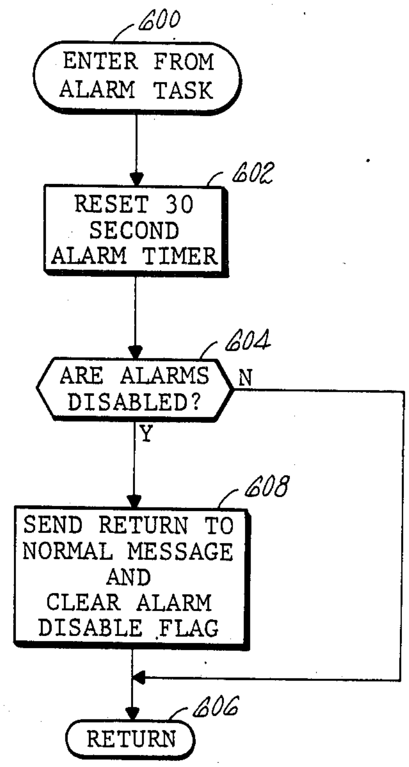
FIG. 6 is a flowchart illustration of a return to normal subroutine.

Referring now to FIG. 6, a "return to normal" subroutine is illustrated. Entrance to this subroutine is made in a step 600 from the alarm task routine of FIG. 3. After entry into the return to normal routine, the thirty second alarm timer is reset to zero in a step 602. A decision is then made in a step 604 as to whether or not alarms are disabled due to the sending of a previous alarm. A decision of "no" produces an immediate return in a step 606 to the alarm task routine of FIG. 3 for rescheduling. A decision of "yes" indicates that an alarm has been previously transmitted and it is therefore necessary to send a return to normal message in a step 608, and clear the alarm disabled flag. Upon completion of this a return is made to the alarm task routine in the step 606 for rescheduling.

The alarm message is normally transmitted immediately, with identification of the remote subsystem, the modem 24 (some subsystems may communicate with an office by means of a modem not uniquely associated with its master 18), equipment number, point number, date and time of occurance, and date and time of transmittal. As was seen in the flow charts of FIGS. 3, 4, 5, & 6, no additional alarm conditions will be recognized and transmitted for that particular equipment until all of its alarm conditions (safeties) have been corrected and the equipment has been returned to normal operation. However, the remote subsystem will continue to recognize and report any alarm message for its other equipment. While in the alarm condition, the processor will record the total time of that condition for each item of equipmenmt. Also, all incidents of verified, significant alarm conditions will be identified and buffered to accumulate the number of occurances and totalized time of occurance per day for each point which has initiated an alarm mode. This daily accumulation of alarm counts and totalized time is treated as data and is available for transfer to the local office.

In order to prevent frequent alarm and alarm cancel message transmissions when a safety or other alarm point cycles on and off (fails to latch off), the remote subsystem will not transmit additional alarm or alarm corrected messages for that item of equipment (device) until the expiration of a selected time interval from the preceeding alarm message for that equipment. The alarm corrected message for the initiating alarm condition is not inhibited or delayed, but any and all succeeding alarm and alarm corrected conditions for that equipment, and their date and time of occurance and total out time, is buffered for consolidated transmission at the end of the time period. Similarily, any alert conditions for that particular equipment occuring during that time interval is also buffered for the consolidated transmission at the end of the dalay period.

Special processing methods are required to identify the particular safety which first opened (first-out) in the many variations of safety circuit arrangements in use. Equipment safety controls are typically arranged in serial chains in both contiguous and segmented arrangements. When any safety contacts in the chain open, all down line safeties are simultaneously deenergized and all indicate an alarm status. For the processor to be able to select the actual first safety out, alarm points will be set-up by field configuration and/or selective wiring to identify the preceeding alarm (safety) points (if any) for "OR" logic interpretations.

When any alarm point is first sensed to be in the alarm state (typically loss of power) and it passes the tests of input polarity, run mode dependency, time delays, etc., this fact will be buffered. As described above, the processor will then look at the status of the identified preceeding alarm, if any. If the preceeding point is also buffered to be in a confirmed alarm mode on the same data scan, the succeeding point will be rejected as a first-out possibility. It will do this analysis of all alarm mode points to select the one which does not have a preceeding alarm point in the alarm mode. Alternate first-out logic algorthims are equally acceptable if they adequetely define the range of alarm points in the safety chain (including intermixed non-safety contacts) and allow the required application flexibility.

Safety controls are often preceeded by, and/or intermixed with, non-safety related operating and limit control switches and relay contacts. Opening of such switches and contacts simultaneously deenergize all down line safeties and place them in an apparent alarm (loss of power) status. To avoid erroneous alarm messages from such normal conditions, many alarm points are configured to be dependent for significance on the run mode (powered) status of the closest preceeding non-safety type switch or contact. These conditional monitoring points will be sensed as special data points (not always reported). In some applications, more than one dependency point may be required. In all cases, the run mode point status must be sensed on the same data scan as the alarm points status. Some alarm conditions, of course, such as loss of power supply to a control circuit, are not set-up to be dependent on any data (run mode) point.

As described above, following the recognition and reporting of a verified alarm condition, the remote subsystem transmits an "alarm condition corrected" type message when, but not until, all alarm points for that particular equipment have been corrected. Typically that will require a manual reset of the safety and/or control circuit, or shutting the equipment off to drop out the run modes the alarm points are tied to. Typically, the safety shutdown procedure will activate other alarm points (open other safeties), and will correct the initiating alarm condition (sometimes quickly) prior to the correction of all alarms. The alarm corrected message will identify the remote subsystem, the transmitting modem, the particular equipment number, date and time of occurance, date and time of transmittal, and the total time in minutes that the equipment has been in the alarm condition.

Any equipment remaining in an alarm state at the time the daily summary data is scheduled to be called in will cause an "alarm condition continued" type message for that equipment for the current day to be included with the daily summary data for the previous day.

If there are no points with any values (the equipment did not opérate that day), a "no data" message will be transmitted to indicate that the remote subsystem was alive and functioning on that day. When a remote subsystem does not call in its daily summary data by a selected time, the central office or the host computer will send a "remote number xxx not responding" message to the appropriate office.

The remote subsystem master will have an external key switch labeled "inspect/test." A "test data" code will be appended to all messages transmitted while this switch is in the "on" position to keep set-up and check out test messages out of the normal data base, and to prevent field personnel from erroneously responding to such messages.

A second function will be to transmit an "inspection mode" message when the switch is turned on, and an "off inspection mode" (with the total inspection time) when the switch is turned off. This will be used by service technicians while inspecting or servicing equipment be monitored.

Figure 7:
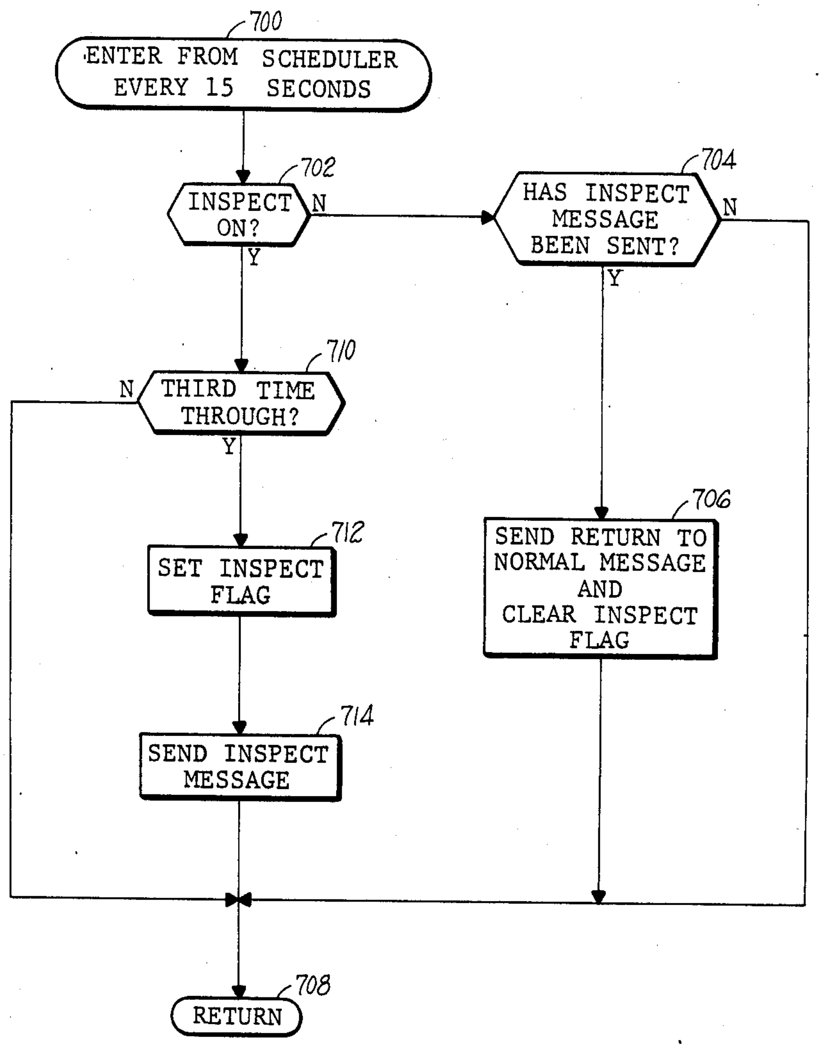
FIG. 7 is a flowchart illustration of an inspect task routine.

Referring now to FIG. 7, an "inspect task" routine will be entered every 15 seconds as indicated in a step 700 from the scheduler to check if the inspection input for a device is turned on. A determination is made in a step 702 as to whether the inspection switch has been turned on by a serviceman. If the inspection bit is not on, then a check is made in a step 704 to determine if a previous inspection message has been transmitted. If it has, a return to normal message is transmitted and the inspection flag is cleared in a step 706. A return to the scheduler is then made in a step 708. If a decision is made the step 704 that the inspection message has not previously been sent an immediate return is made to the scheduler in the step 708.

If it has been determined in the step 702 that the inspection bit is on, a decision is made in a step 710 as to whether the inspection bit has been found to be on for three successive passes through the inspect task routine. If it has not, an immediate return is made in the step 708 to the scheduler. If the inspection bit has been found to be on for three successive passes the inspection flag is set in a step 712 and an inspection message is sent in a step 714. A return is then made in the step 708 to the scheduler.

Figure 8:
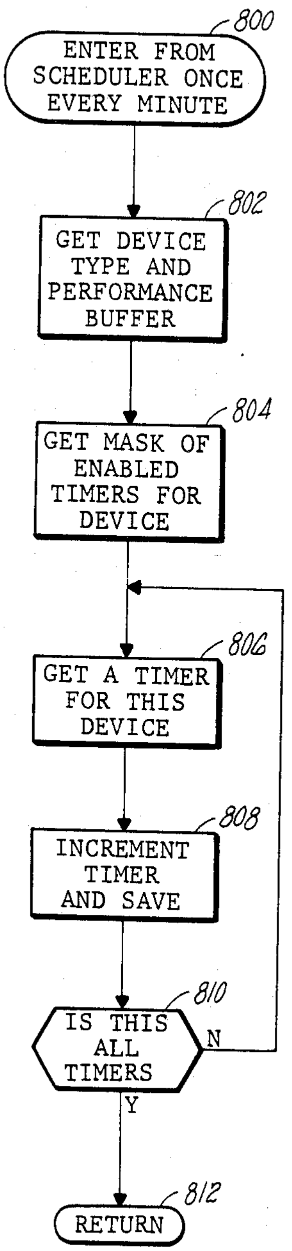
FIG. 8 is a flowchart illustration of a timer task subroutine.

Referring now to FIG. 8, a "timer task" subroutine is illustrated. This subroutine is scheduled to run once every minute from the scheduler as indicated in a step 800. Upon entrance to the subroutine, the device's performance buffer is obtained as indicated in a step 802. A mask of the timers that are enabled for that particular device is next obtained in a step 804. The first timer which is enabled for the device is then obtained in a step 806 and is incremented by one minute (or incremented to represent a one minute interval), and the new timer value is saved in a step 808. A decision is then made in a step 810 as to whether all enabled timers for the device have been incremented. If not, the loop containing steps 806, 808, and 810 is repeated until all timers for the device have been incremented. At the completion of incrementing all timers for the device, a return to the scheduler is performed in a step 812.

Figure 9:
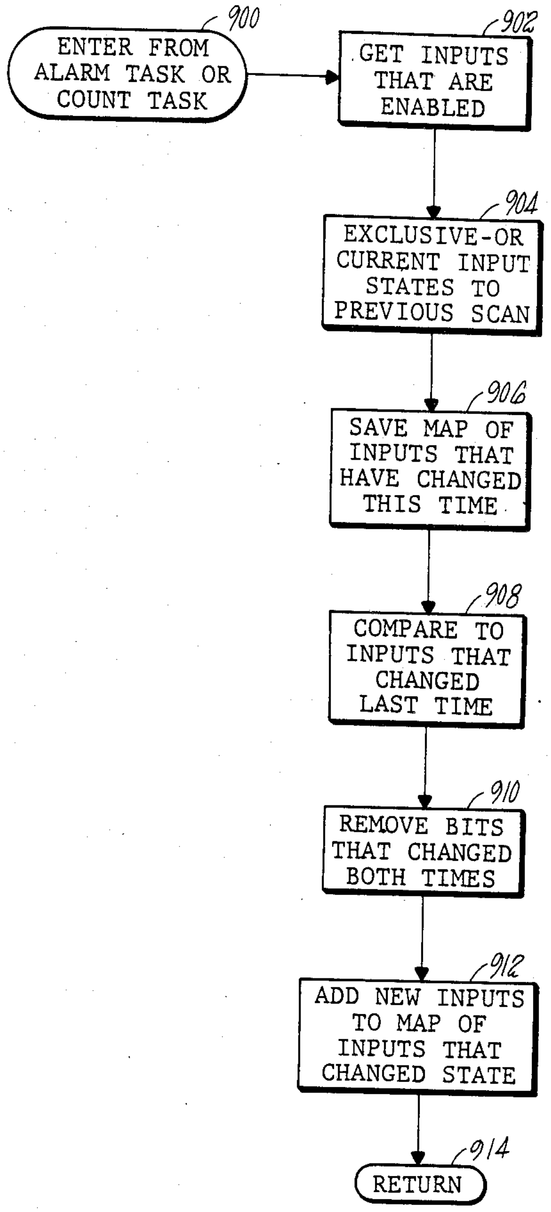
FIG. 9 is a flowchart illustration of a logic subroutine.

Referring now to FIG. 9, a "logic" subroutine is illustrated. Entrance to the logic subroutine is made in a step 900 from a count task subroutine to be described in more detail below. The purpose of the logic subroutine is to determine those inputs which have changed state and remained in that state for at least two successive inputs scans. This is done by first determining in a step 902 the inputs which are currently enabled to be looked at. Enabled inputs are then Exclusively-Ored in a step 904 to compare their current input state to the previous input state. Those inputs that have changed state this time are saved in a step 906. A comparison is then made in a step 908 between inputs that have changed this time to those that have changed the previous time. If an input is determined to have changed both times in the last two scans, it is removed in a step 910 from the map of changed state inputs, since two successive input scans of the same input state are required in order to consider an alarm valid. Those remaining bits which have not changed state in the last two previous states are added in a step 912 to the list of new inputs that have changed state. A return is then made in a step 914 to the alarm task routine of FIG. 3 or to the count task routine to be described in more detail below.

Figure 10:
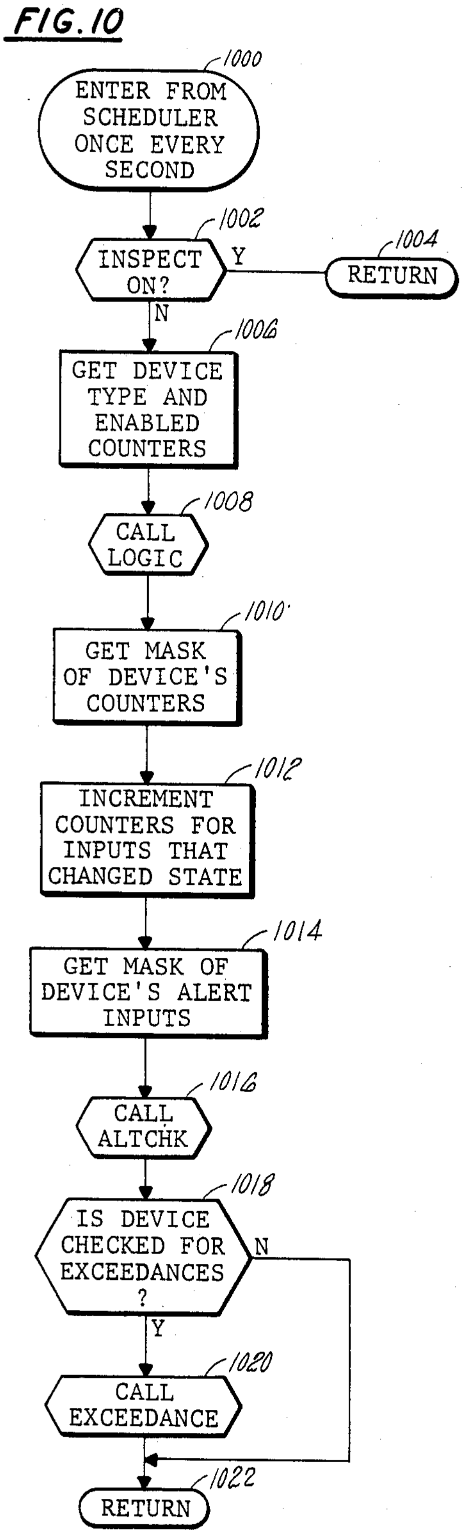
FIG. 10 is a flowchart illustration of a count task routine.

Referring now to FIG. 10, a "count task" routine is entered from the scheduler in a step 1000 once every second. Its purpose is to count the number of times the input changes state from on-off as one count. After entering the routine, an immediate check is made in a step 1002 to detect if the inspection input is set. If so, all counts are disregarded for all inputs and a return is made in a step 1004 to the scheduler. If inspect is not enabled, the inputs to the device are sampled and read in a step 1006. A call to the subroutine "logic" is then performed in a step 1008. Upon returning from the "logic" subroutine, the count flowchart will have a map of every input for the associated device which has changed state and remained in that state for two consecutive input scans. A mask of the counters associated with the inputs of that device is then obtained in a step 1010. That mask is compared against the results of the logic subroutine. For those inputs which have changed state as determined by the logic subroutine, a counter for the input is incremented in a step 1012. The count task routine then obtains in a step 1014 the mask of inputs that are associated with the alert function. A subroutine call is then made in a step 1016 to the alert check subroutine. Upon returning from this subroutine, the operation of which will be described in more detail below, a decision is made in a step 1018 as to whether the device is checked for exceedances. If not, an immediate return is made in a step 1022 to the scheduler. If the device is checked for exceedances, an "exceedance" subroutine is called in a step 1020. The function of the exceedance subroutine is to check for exceedance limits. After execution of subroutine "exceedance" a return is made in the step 1022 for rescheduling.

Figure 11:
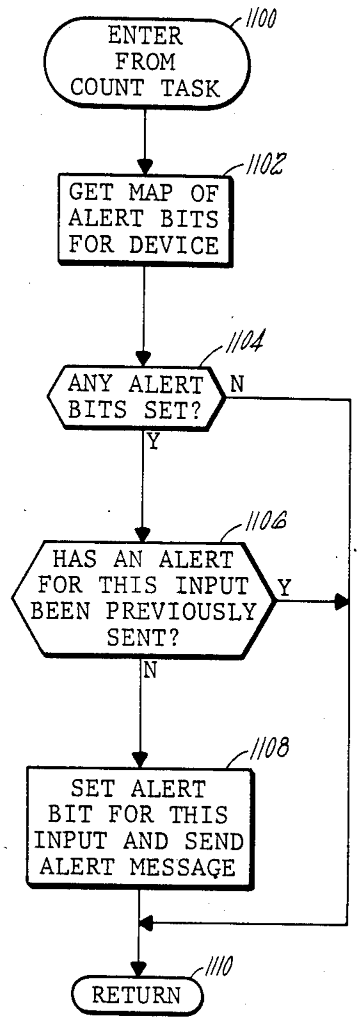
FIG. 11 is a flowchart illustration of an alert check subroutine.

Referring now to FIG. 11 an "alert" subroutine is illustrated. Entrance to the alert check subroutine is made from the count task routine in a step 1100. Its purpose is to check for the presence of an alert condition associated with an input for the device. After entering the subroutine, a map of alert bits for that device is obtained in a step 1102. This map is compared in a step 1104 against the bits that have changed state on the scan as a result of calling the subroutine logic. If no alert bits have been set a return is immediately made in a step 1110 to the count task routine. However, if any alert bits have been set then a check is made to see if this bit has been previously in alert. This is performed in a step 1106 by checking for the alert bit flag associated with that input. If this flag is set then an immediate return is made in the step 1110 to the count task routine of FIG. 10. If this particular input point has not been alert previously, the alert bit is set in a step 1108 for the input and an alert message is transmitted to local. A return is then made in the step 1110 to the count task routine. It should be noted that the alert bits will be reset to zero when performance data for this particular device are transmitted in the middle of the night. Therefore, only one alert per day is obtained from an alert input bit.

Figure 12:
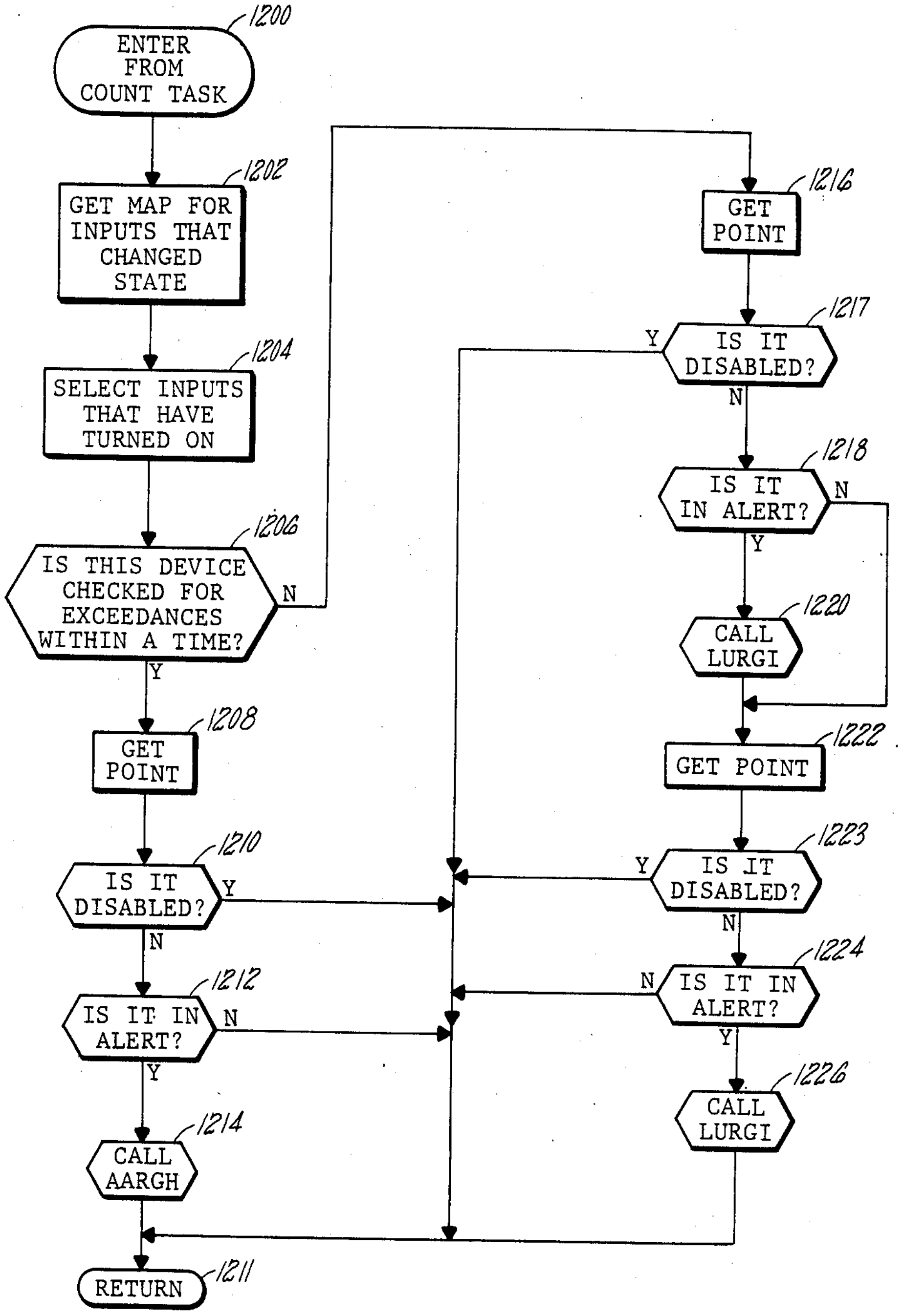
FIG. 12 is a flowchart illustration of an exceedance subroutine.

Referring now to FIG. 12, an exceedance subroutine that is called from the count task routine is illustrated. Its purpose is to check for exceedance limits. After entrance to the subroutine in a step 1200, the maps for inputs that have changed state are obtained in a step 1202. Those inputs that have turned on are then selected from the map in a step 1204. The device type is then checked in a step 1206.

A device that has an exceedances checked within a selected period will then have its point obtained in a step 1208 for testing. A test is made in a step 1210 to see if it is disabled. If it is, a return is immediately performed in a step 1211. It it is not disabled a check is made in a step 1212 to determine if it is in alert. If it is not, a return is made in a step 1211. If it is an alert, a call to a subroutine AARGH is performed in a step 1214. The AARGH subroutine is used to deal with possible alerts for a certain number of exceedances with the selected period. After executing the AARGH subroutine a return is made in the step 1211 to the count task routine of FIG. 10.

For an equipment device that is not checked for exceedances within a selected period, but only an exceedance without regard to timing, the related point is obtained in a step 1216, and a check is made as to whether the point is disabled in a step 1217. If it is disabled a return is made. If not, it is checked to determine if it is in alert or not, in a step 1218. If is in alert a call to a subroutine LURGI is made in a step 1220. The subroutine LURGI will be described in more detail below. If the point is not in alert the subroutine LURGI is not called and a step 1222 is executed directly. In any event, the point is reobtained in step 1222. If the point is disabled, an immediate return is made in a step 1223. If not, a determination is then made in a step 1224 as to whether the point is in alert or not. If it is in alert subroutine LURGI is called in a step 1226. If it is not, a return to the count task routine is made in the step 1211.

Figure 13:
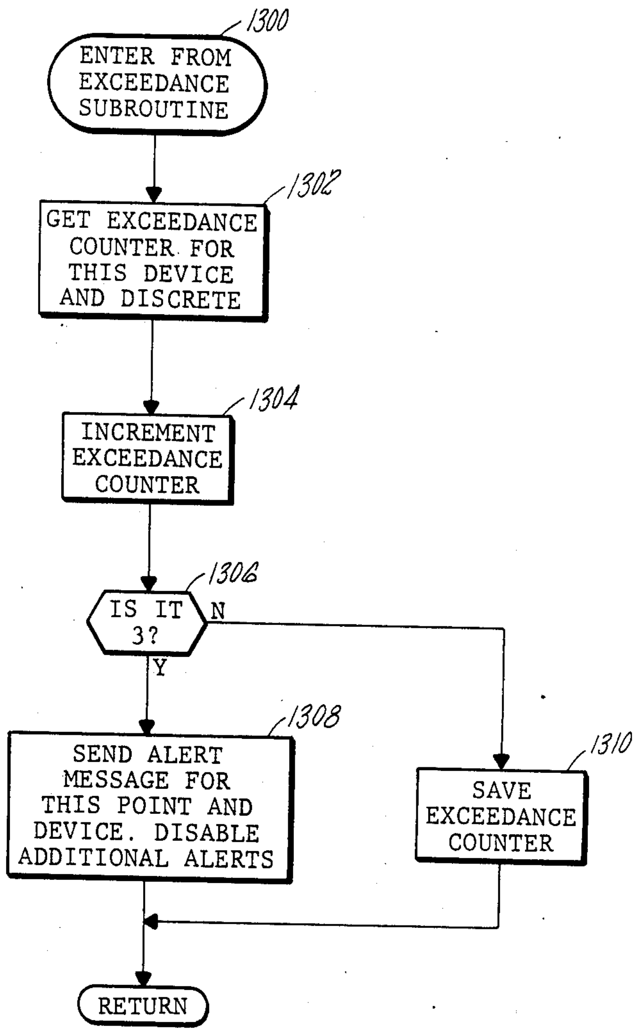
FIG. 13 is a flowchart illustration of a LURGI subroutine.

Referring now to FIG. 13 the LURGI subroutine is illustrated. LURGI is called from the exceedance subroutine of FIG. 12. Upon entrance to the routine in a step 1300, the exceedance counter for this device and discrete is obtained in a step 1302. The counter in incremented in a step 1304 after which it is tested in a step 1306 for the value three. For this specific case, the value of the exceedance alert limit is three. Of course, for other cases it could be any selected value. If, in this particular case, it is three, an alert message for this point and device is sent to local and the alert for this particular point is disabled in a step 1308 to prevent future alerts. If the value of the counter is not equal to three, then the exceedance counter is saved in a step 1310. Following this a return from subroutine LURGI is made back to the exceedance subroutine of FIG. 12.

Figure 14:
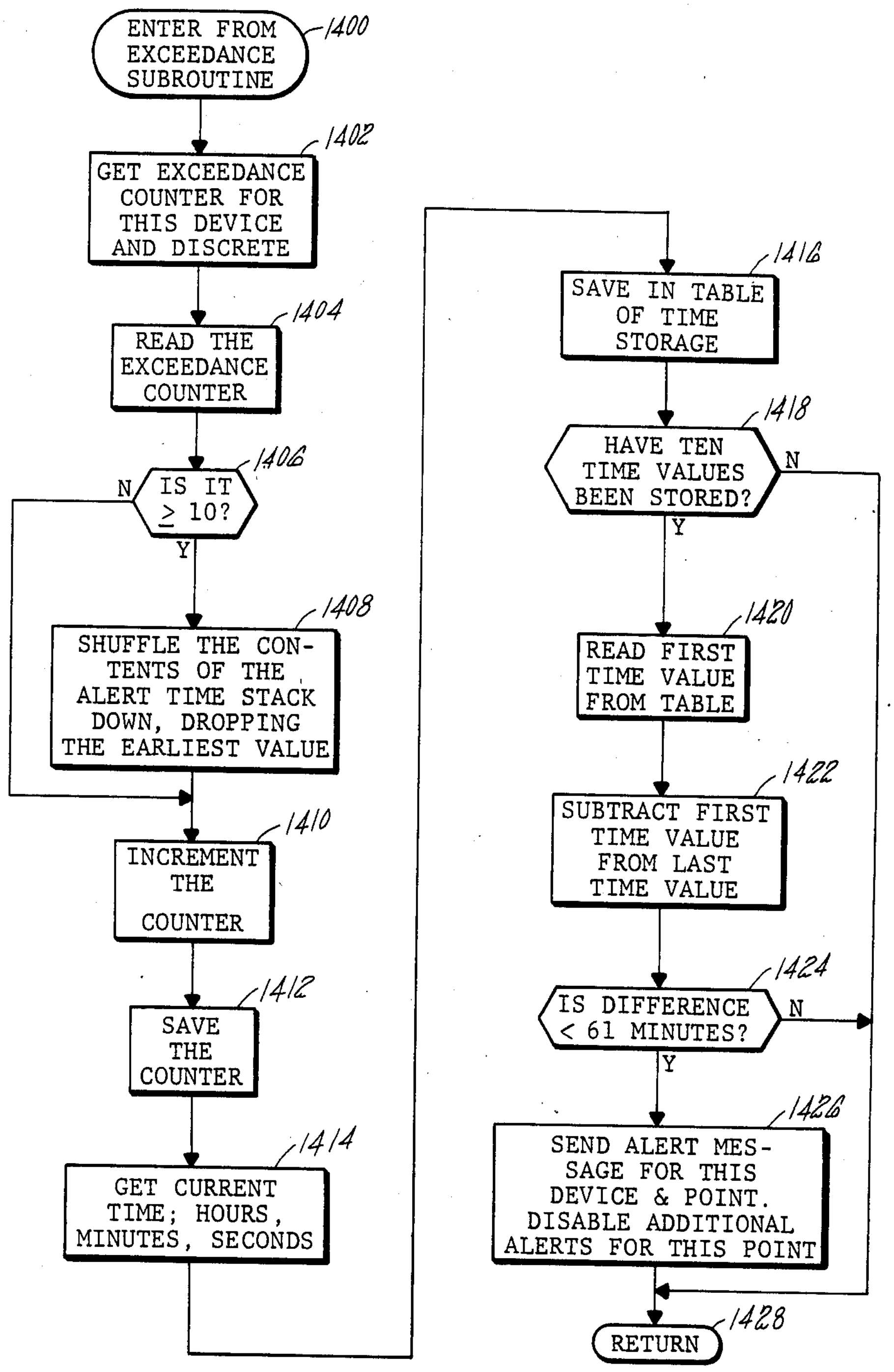
FIG. 14 is a flowchart illustration of an AARGH subroutine.

Referring now to FIG. 14, the AARGH subroutine is illustrated. As mentioned above, the AARGH subroutine is used to deal with possible alerts on a point that is checked for exceedances within a time period. In this particular case, this point can have up to ten exceedances per hour before alerting to a local. In order to test for this condition, a table is maintained for the last ten alerts for that point along with the ten times when these alerts occurred.

Upon entrance to the routine in a step 1400, the exceedance counter for the device discrete point is obtained in a step 1402. A reading is then made in a step 1404 of the value of the exceedance counter. The value obtained is then compared in a step 1406 to a value of ten or more. If the value is equal to ten or more, then the contents of the table which contains the ten alert times is shuffled in a step 1408. That means the earliest value is dropped and the latest value is added. If the value is not equal to or greater than ten, then the shuffle does not occur. The counter is then incremented in a step 1410 and saved in a step 1412.

The time is next obtained in a step 1414 in hours, minutes, and seconds and saved in a step 1416 in a table for storage. A check is then performed in a step 1418 to see if ten time values have been stored. If the answer is no the AARGH subroutine returns in a step 1428 to the exceedance subroutine of FIG. 12. If the answer is yes, then the first time value stored in the table is obtained in a step 1420. It is then subtracted in a step 1422 from the last time value which has just been read. The difference between the two times is then compared in a step 1424 to the value 61 minutes. If the value is greater than 61 minutes a return is made in the step 1428. If the value is less than 61 minutes, then the limit of 10 exceedances per hour has been exceeded. Therefore, an alert message is sent in a step 1426 for this device and point to local. Furthermore, this point is disabled in step 1426 from having additional alerts. A return from the AARGH subroutine is then performed in the step 1428.

As mentioned above, alert messages signify anticipatory conditions which indicate that a deleterious but not yet serious condition has occured with the equipment or its system. It will occur when a monitored condition exceeds a preset limit as has been described in FIG. 13. As has been described in FIG. 14, certain equipment may have points checked for exceedances only during a selected period, e.g., for 61 minutes after, for example, the start of the run mode for that particular equipmentor at any other time. In the flow chart of FIG. 14, the monitored equipment is checked for exceedances greater that or equal to 10 but only if the equipment has been running for 61 minutes. Alert points can be configured for a field selected time delay of this kind. The time delay can be configured to default to zero if no time value is entered.

As mentioned above, alert points are anticipatory of deleterious conditions which may become serious within the equipment or its system. Only the first occurance per day of each alert condition is reported at the time of occurance, and is transmitted as an "alert" type message. Alert points are also treated as information points in that all incidents of alert conditions are identified, timed and buffered to accumulate the number of occurances and totalized time of occurance per day for each point. This accumulated information is transmitted once a day with the accumulated data point information. It should be noted that unlike other alert messages, the alert messages associated with FIG. 14 may also include the value (number) of the count. Only the first exceedance per day for each point will be considered an alert. The program can be configured so that if no exceedances values are entered for the data point configurations set-up, the processor will default to a no limit for that point.

Figure 15:
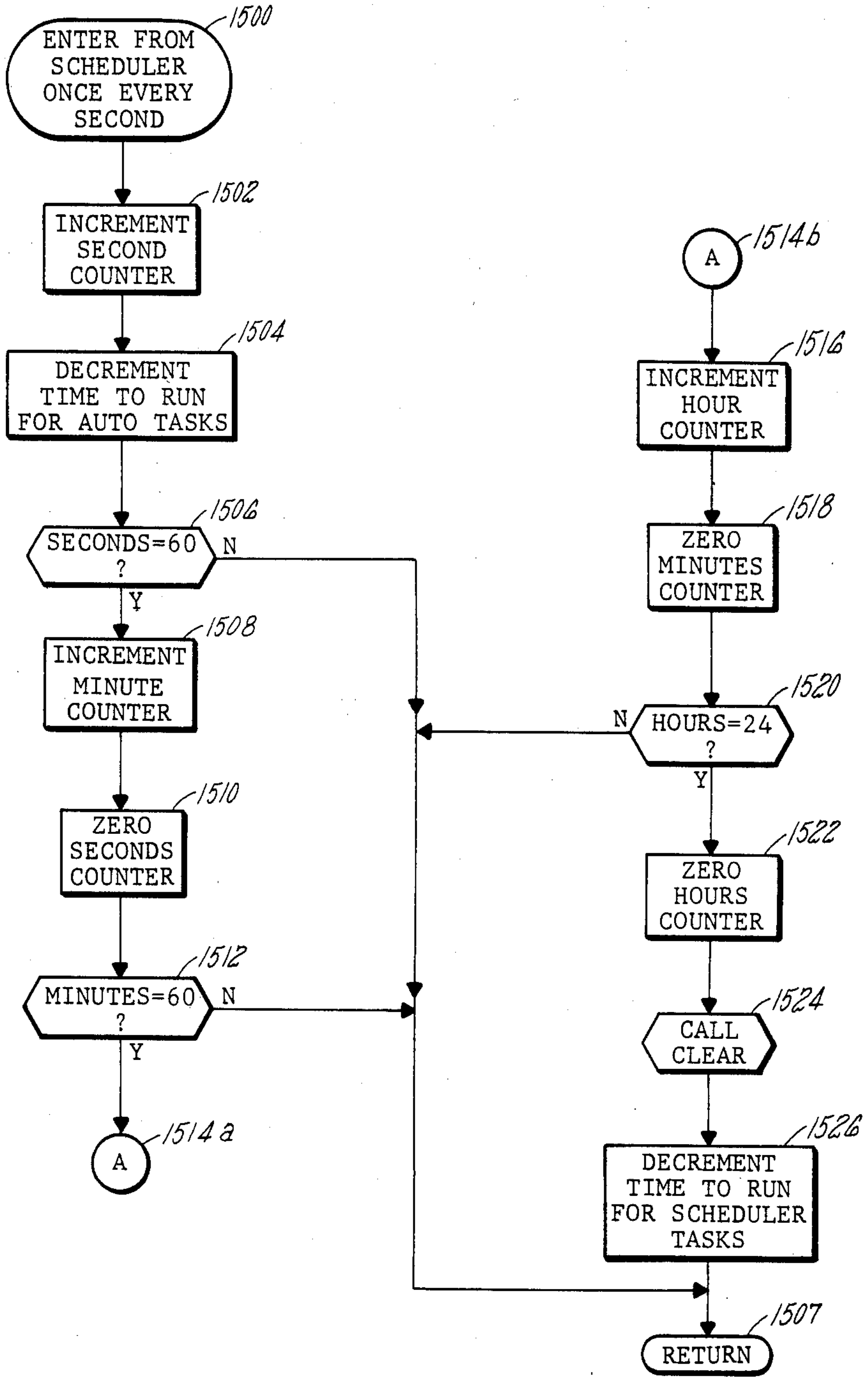
FIG. 15 is a flowchart illustration of a time task routine.

Referring now to FIG. 15, a "time task" routine is entered in a step 1500 once every second from the scheduler. Its purpose is to increment the time-of-day clock and to call the clear routine at midnight. The time-of-day clock is updated every second in a step 1502. The time to run for all automated tasks is decremented by one second in a step 1504. A check is then made in a step 1506 to determine if sixty seconds has been counted. If sixty seconds have not been counted a return is made in a step 1507 to the scheduler. If sixty seconds have been counted a minute counter is incremented in a step 1508 and the seconds counter is zeroed in a step 1510. A check is then made in a step 1512 to determine if sixty minutes have been counted. If not, a return is made in the step 1507 to the scheduler. If sixty minutes have been counted a transition is made in FIG. 14 for purposes of illustration only from a transitional step 1514*a* to a transitional step 1514*b*. An hour counter is then incremented in a step 1516 and the minutes counter is zeroed in a step 1518. Hours are then checked in a step 1520 to be sure that at midnight hours are reset so that the time-of-day clock will begin again at zero hours. If the counted hours are not equal to 24 a return is made in the step 1507 to the scheduler. If the hours are equal to twenty-four the hours counter is zeroed in a step 1522 and a "clear" subroutine is called in step 1524. The clear subroutine will be described in more detail below. Upon returning from the clear subroutine a step 1526 is executed in which the time to run for scheduler tasks is decremented. A return is then made in the step 1507 to the scheduler.

Referring now to FIG. 16, an illustration of the "clear" subroutine is shown. The clear subroutine is entered in a step 1600 from the time task routine of FIG. 15 and functions to clear all alert disabled flags in a step 1602 at midnight since only one alert per point is allowed. In addition, the counters associated with all alerts are zeroed in step 1604 so that accumulation for the next day may be begin anew. Thirdly, all counters and timers associated with exceedance values are cleared in a step 1606 at midnight so that they can also begin accumulating for the next day. A return is then made in a step 1608 to the time task routine of FIG. 15.

Figure 17:
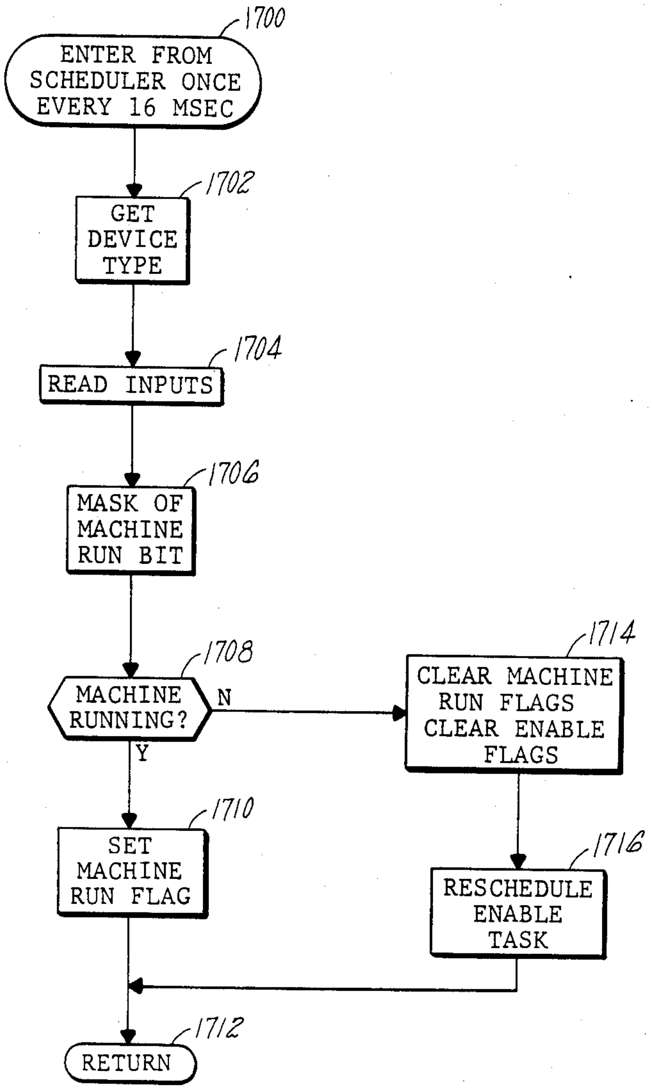
FIG. 17 is a flowchart illustration of a run task routine.

Referring now to FIG. 17, an illustration of a "run task" routine is shown. This routine is entered from the scheduler once every 16 milliseconds as shown in a step 1700. Its purpose is to check to see if the device which is being monitored is running. First, the device type is obtained in a step 1702. The inputs for the device attached to the remote subsystem are then sampled in a step 1704. These bits are masked off in a step 1706 against the specific input bit associated with the device being in the run mode. A test is then made in a step 1708 to see if this bit is set. If it is set, the machine run flag is set in a step 1710 and a return is made in a step 1712 to the scheduler. If the device run bit is not set, then the device run flag is cleared and the enabled flag for the inputs associated with that device (which are conditional upon device run) are cleared in a step 1714. In addition, the enable task is rescheduled in a step 1716 to be reenabled by the scheduler. A return is then performed in the step 1712.

Referring now to FIG. 18, an "autotask" routine is illustrated. The autotask routine is entered in a step 1800 from the scheduler once a day, typically, in the middle of the night. Its purpose is to get the performance data associated with the device and to send a performance message containing the performance data to the local in a step 1802 for accumulation of historical data on the device. The task schedules communications and transmits the performance message to the local. After a successful completion of the transmission, a return is made in a step 1804 to the scheduler.

In order to determine the significance of points that have changed state in most cases it is necessary for the processor to first determine if the equipment is running or if the appropriate sections of the control circuit are powered. The field configuration of each monitored point allows the selection of one or two particular data points it is dependent on for the run mode determination. This "AND" condition analysis requires the monitored point and its tied in data points to all be in a confirmed true mode (not necessarily the same input polarity) for the particular condition to be considered significant for further processing. The point status and its run mode status are sensed in the same data scan. Not all points must be dependent on a run mode (powered) condition and, in that case, the processor will default to in an independent relationship for that point.

Figure 19:
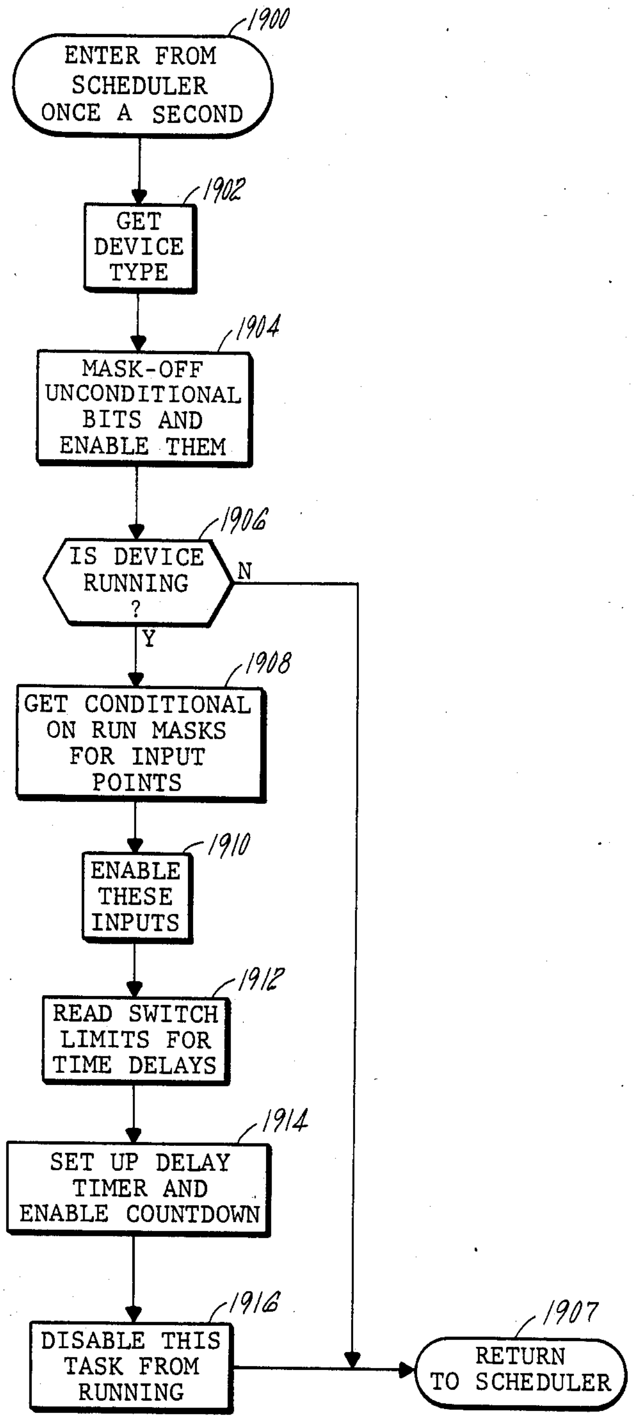
FIG. 19 is a flowchart illustration of an enable task routine.

Referring now to FIG. 19, a first "enable task" routine is illustrated. The first enable task routine is scheduled to run once a second as indicated in a step 1900. Inputs to the remote subsystem are of three types: (1) unconditional, i.e., enabled whether the machine is running or not; (2) conditional on the machine being in the run mode; or, (3) conditional on the machine being in the run mode for a specified period of time subsequent to starting. Because of these three types, the enable task performs the function of: (1) performing an unconditional enable; (2) upon the detection of the device running, enabling those inputs which are conditional upon the machine being in the run mode; and (3) setting up the timers associated with the timeouts for specific points that are of type (3). Once an input as enabled, it is made part of an enable mask which is used by other routines for the purpose of sampling. These are referred to as maps or masks.

The first enable task routine begins by determining the device type in a step 1902. Once the device is known, unconditional bits are enabled in a step 1904. A check is then made in a step 1906 to see if the device in the run mode. If not the routine returns in a step 1907 to the scheduler. Assuming the device is in the run mode, the mask for inputs that are conditional and device run are obtained in a step 1908 and enabled in step 1910. The routine then reads in a step 1912 selectable switch inputs which define the time delay associated with those points which are enabled after device run with the delay time. For each one of these inputs a timer is setup in a step 1914 and enabled to count down. Upon completion of step 1914 the enabled task routine is disabled from running again in a step 1916. The reason for this disablement is that since the machine is now in the run mode, there is no need to reread the switch inputs and resetup timers. This need be done only once, upon device run. However, the run task run routine of FIG. 17 which checks for the machine running in the step 1708 will clear all enabled flags and run flags and reschedule the enabled task routine of FIG. 19 upon detecting that the device is no longer running.

Figure 20:
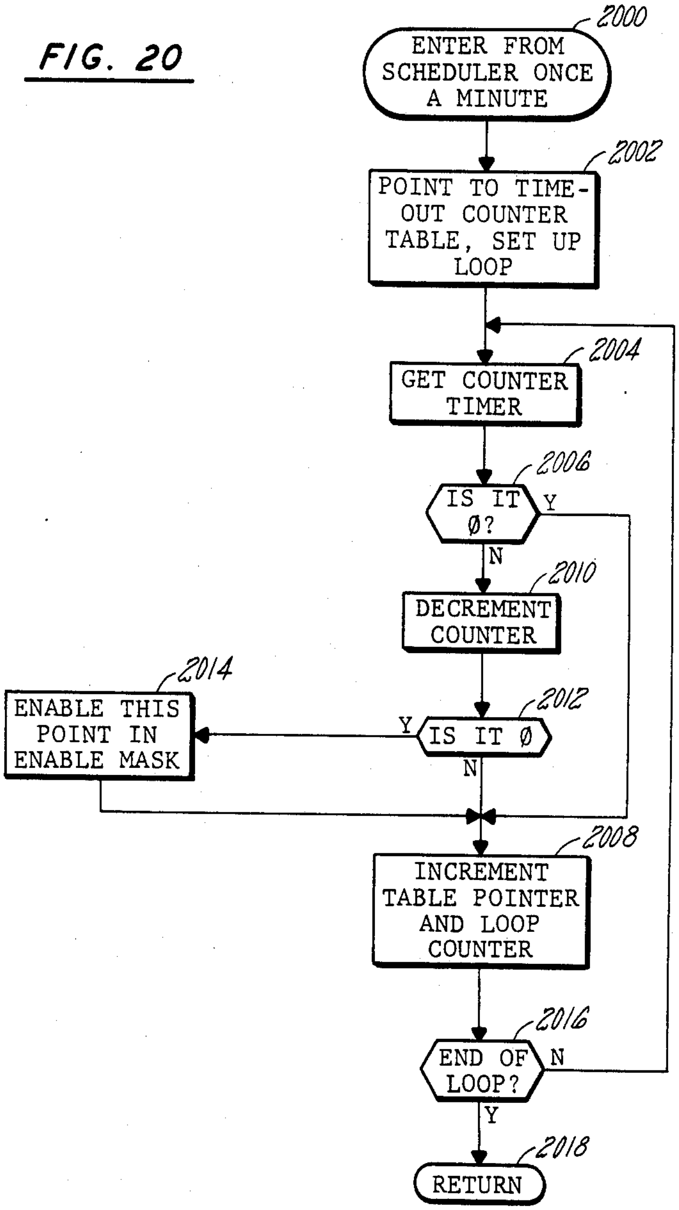
FIG. 20 is a flowchart illustration of an enable task routine.

Referring now to FIG. 20, a second "enable task" routine is illustrated. The purpose of this task is to decrement the timers for those inputs that are delayed from device run before being enabled. A table is maintained which points to all of the timers associated with this function.

Upon entering the routine in a step 2000, the first entrance point into the above mentioned table is obtained in a step 2002 and a loop is setup for the purpose of decrementing all timers. The first timer is obtained in a step 2004 and it is tested for zero in a step 2006. If its value is zero the table pointer is incremented in a step 2008 and a loop counter is incremented. If a timer value is zero, then that point must have already expired and be enabled and therefore no action is taken. If the value is not zero the counter is decremented in a step 2010. A test is then performed in a step 2012 to determine if that timer has just now gone to zero. If it has, that point is now enabled in the step 2014 for sampling. If it is not, no further action is taken for that particular counter. The table pointer and loop counters are now incremented in the step 2008. A test is then made to determine if the routine has looped through all of the entries in the table. If not, the process is repeated with steps 2004–2016 until all the entries have been examined. If the loop has ended a return is made in a step 2018.

Data points are usually wired directly to the native control circuits of the monitored equipment to count and time the starts or stops of the equipment, staged operation, cycles, etc. These points serve several purposes. Accumulated daily counts, totalized time and other recorded information of the data points are combined with daily counts and totalized time information of alarm and alert points to make up the Daily Activities Summary information described below. Also, discrete data points can provide alert functions by assigning exceedance limits, and can serve as the basis for run mode dependancy relationships with other points on the same equipment. When a discrete data point is intended for use solely to determine the run mode condition for other points (typically alarm points), the recording of related data for that point can be suppressed. When suppresesed, the processing instructions default to normal counts and totalized time accumulations. Discrete data plans can be configured for a time delay after the point is powered up (or depowered with reverse polarity) before the point is considered in the true mode for data accumulation and run mode dependency. The time delay will default to zero seconds if no value is entered for the point configuration set-up.

The accumulation of all daily counts and totalized time for each discrete alarm, alert and data point will be retained by the remote subsystem as "Daily Summary Data" until it is automatically cleared. This summarized daily data will be stored for seven consecutive days, in daily segments. The time period for each daily accumulation will be from midnight to midnight. Thus, the remote will always be storing significant new daily data while separately retaining the previous seven day's accumulation. The weekly data will be buffered on a sliding basis, with the previous seven days' always in storage. At the end of each day, the oldest day's data will be purged and the current day's totals added to the weekly block. The data will not be cleared when it is transmitted.

"Daily Summary Data" transmissions will identify the date and time of transmission, the remote subsystem, the modem (some remote systems may be grouped at different sites under a single modem at one site for that group's communications with a central or a host) and will group the point data by equipment number. Point numbers with null values will not be transmitted. If there are no points with any values for seven days (the equipment did not operate), a "No Data" message for each item of equipment will be included. When set-up for weekly summary transmission, each daily segment will also be identified by its date of occurance.

Although the above best mode disclosure defines the operation and equipment hardware for a particular embodiment of the invention, it should be understood that the invention may be practiced in other embodiments. The invention is generally applicable to any operating system in which a universally adaptable monitoring system is desirable.

Therefore, although the invention has been shown and described with respect to an illustrated embodiment thereof, it should be understood by those skilled in the art that the foregoing and various other changes, omissions, and additions in the form and detail thereof may be made therein without departing from the spirit and the scope of the invention.

We claim:

1. A remote subsystem for monitoring the status and performance of at least one unit of equipment at a remote site by periodically monitoring the states of a plurality of discrete parameter signals, associated with each unit of equipment, each related parameter signal being indicative of a like plurality of unit status parameters, said remote subsystem transmitting periodic messages indicative of the equipment status and performance to at least one related office, comprising:

signal processor means, responsive to the discrete parameter signals and having memory means for storing signals indicative of a previously monitored state of each periodically monitored discrete parameter signal, wherein selected discrete signals each having normal and abnormal states indicative of normal and abnormal conditions, respectively, are related in alarm groups, each group corresponding to a particular unit of equipment, said signal processor means comparing the presently monitored state of each discrete signal with a previously stored state of that signal for detecting a state change therebetween, said signal processor providing an alarm status signal for only the first discrete signal in an alarm group of related discrete signals to change state from a normal state to an abnormal state, said alarm signal being indicative of an associated abnormal condition in said corresponding unit of equipment, said signal processor providing a return to normal signal upon detecting a change in said first discrete signal from the abnormal state to the normal state only if all said discrete alarm signals in said related alarm group are presently in the normal state; and communication element means, responsive to said alarm signal and said return to normal signal for transmission thereof to a related office.

2. The remote subsystem of claim 1, further comprising display means, responsive to said alarm status signal for displaying an alarm message describing said corresponding equipment alarm condition and responsive to said return to normal signal for displaying a return to normal message.

3. The remote subsystem of claim 1, wherein said communication element means transmits said alarm and return to normal signals to both a local office and a central office.

4. The remote subsystem of claim 1, wherein said signal processor additionally provides said alarm signal only if said first discrete signal remains in said changed state for a selected period.

5. The remote subsystem of claim 1, wherein said signal processor provides additional alarm signals for said first signal to change state only after all of said discrete signals in said group have returned to normal and said return to normal signal has been provided to said communication element means.

6. The remote subsystem of claim 1, wherein said signal processor inhibits additional alarm and return to normal signals associated with a particular equipment for a chosen interval after providing an immediately preceding alarm signal associated with that particular equipment except that a return to normal signal associated with the initiating alarm signal for said particular equipment is not inhibited.

7. The remote subsystem of claim 1, wherein said signal processor records over a period, the total time said corresponding unit remains in said alarm condition and periodically provides a signal indicative thereof via said communication element means for transmission to said office.

8. The remote subsystem of claim 1, wherein said signal processor periodically accumulates the number of occurances of alarm conditions for each unit and periodically provides a signal indicative thereof via said communication element means for transmission to said office.

9. The remote subsystem of claim 1, further comprising means for detecting said corresponding unit of equipment in an energized mode and providing an associated alarm enable signal indicative thereof to said signal processor means for inhibiting said alarm status signal unless said associated alarm enable signal is present.

10. The remote subsystem of claim 1, further comprising memory means for storing identification information relating to said subsystem and historical information relating to the past states of each of said parameter signals and further comprising clock means for monitoring the time of day and storing alarm time and duration information in said memory, wherein said alarm status signal provides identification of said remote subsystem, said communication element, said corresponding unit of equipment, said associated alarm condition, date and time of said change of state of said first signal, and date and time of transmittal of said alarm status signal via said communication element means.

11. The remote subsystem of claim 10, wherein said return to normal signal provides identification of said remote subsystem, said communication element, said corresponding unit of equipment, said associated alarm condition returned to normal, date and time of transmittal of said return to normal signal via said communication element means.

12. The remote subsystem of claim 1, wherein said signal processor records the number of state changes in a selected status signal and provides an alert signal to said communication element indicative of an impending abnormal condition in the presence of said recorded number exceeding a preset limit and wherein said communication element is responsive to said alert signal for immediate transmission to said related office.

13. The remote subsystem of claim 12, wherein only the first occurrence in a selected period of said recorded number exceeding a preset limit results in said processor providing said alert signal to said communication element for immediate transmission.

14. The remote subsystem of claim 13, wherein said signal processor counts all occurrences per day of said recorded number exceeding a preset limit and provides an alert count signal indicative thereof, and wherein said remote subsystem further comprises memory means for storing said alert count signal, and wherein communication element is responsive to said alert signal for periodic transmission to said related office.

15. The remote subsystem of claim 14, wherein said memory stores identification information relating to said subsystem and wherein said remote subsystem further comprises clock means for providing a time signal indicative of the time of day, said memory responsive to said time signal for storing the time of occurrence of each alert signal and wherein said communication element is responsive to said stored time signal for periodic transmission to said related office.

16. The remote subsystem of claim 1, wherein said signal processor is responsive to status signals indicative of operating equipment data including run condition, starts, stops and cycles and provides data signals indicative thereof to said communication element which is responsive to said data signals and periodically transmits said data signals to said related office.

17. The remote subsystem of claim 1, wherein said signal processor accumulates, during a selected period, the value of all parameter signals that changed state during said selected period and periodically provides a period summary signal indicative of the accumulated signals' values during said selected period to said communication element which is responsive to said summary signal and periodically transmits said summary signal to said related office.

18. A system for monitoring a plurality of remote subsystems, each remote subsystem monitoring the status and performance of at least one unit of equipment at an associated remote site by periodically monitoring the states of a plurality of discrete parameter signals, associated with each unit of equipment, each related parameter signal being indicative of a like plurality of unit status parameters, said remote subsystem transmitting periodic messages indicative of the equipment status to at least one related office, comprising:

plural remote subsystem signal processor means, each responsive to the associated equipment's discrete parameter signals and having memory means for storing signals indicative of a previously monitored state of each periodically monitored discrete parameter signal, wherein selected discrete signals each having normal and abnormal states indicative of normal and abnormal conditions, respectively, are related in alarm groups, each group corresponding to a particular unit of equipment, each signal processor means comparing the presently monitored state of each discrete signal with a previously stored state of that signal for detecting a state change therebetween, each signal processor providing an alarm status signal for only the first discrete signal in an alarm group of related discrete signals to change state from a normal state to an abnormal state, said alarm signal being indicative of an associated abnormal condition in said corresponding unit of equipment, each signal processor providing a return to normal signal upon detecting a change in said first discrete signal from the abnormal state to the normal state only if all said discrete alarm signals in said related alarm group are presently in the normal state; and plural remote subsystem communication element means, each responsive to said alarm signal and said return to normal signal from its associated signal processor for transmission thereof to a related office;

plural service office communication element means, at least one for each service office, responsive to said alarm signal and said return to normal signal transmitted from each of said remote subsystem communication element means for providing each of said alarm signals and said return to normal signals; and service office display means, responsive to said alarm signals and said return to normal signals from said service office communication element means, for displaying alarm and return to normal messages corresponding to each alarm and return to normal condition detected for each monitored device.

19. The system of claim 18, wherein each of said plural service office communication element means further comprises means for retransmitting each of said alarm signals and said return to normal signals and wherein said apparatus further comprises:

central office communication element means responsive to said retransmitted alarm signal and said retransmitted return to normal signal for providing said alarm signal and said return to normal signal; and central office display means, responsive to said alarm signals and said return to normal signals from said central office communication element means, for displaying alarm and return to normal messages corresponding to each alarm and return to normal condition detected for each monitored device.

20. The system of claim 19, wherein selected ones of said plural service office communication element means are responsive to said alarm signals from a number of said related remote subsystem communication element means for transmission to said central office display means.

21. The remote subsystem of claim 1, further comprising sensor means responsive to said status parameters for providing the discrete parameter signals.

22. The system of claim 18, further comprising sensor means responsive to said status parameters for providing the discrete parameter signals.

* * * * *